United States Patent [19]

Stout et al.

[11] Patent Number: 4,671,435

[45] Date of Patent: Jun. 9, 1987

[54] PROGRAMMABLE WIDE AREA INSECTICIDE DISPENSING SYSTEM AND METHOD

[75] Inventors: Daniel M. Stout, St. Louis County; Michael W. Ellis, Jackson County; Arthur R. Terwilleger; Robert D. Shankle, Jr., both of Jackson County, all of Mo.

[73] Assignees: Whitmine Research Laboratories, Inc., St. Louis; Alfa-Laval, Inc., Kansas City, both of Mo.

[21] Appl. No.: 696,259

[22] Filed: Jan. 30, 1985

[51] Int. Cl.⁴ .................. B67D 5/08; G04C 5/08
[52] U.S. Cl. ............................ 222/646; 239/69
[58] Field of Search .......... 222/61, 639, 644–649, 222/402.1, 14, 52, 129, 135, 482; 137/624.12; 239/69, 304, 305, 340, 578; 169/61; 364/479

[56] References Cited

U.S. PATENT DOCUMENTS

| | | | |
|---|---|---|---|
| 2,630,347 | 3/1953 | Petery et al. | 222/647 |
| 3,140,720 | 7/1964 | Griswold | 137/624.12 |
| 3,209,950 | 10/1965 | Kise et al. | 222/649 |
| 3,780,766 | 12/1973 | Link | 239/69 X |
| 3,848,775 | 11/1974 | Possell | 222/649 |
| 3,974,941 | 8/1976 | Mettler | 222/646 |
| 4,173,893 | 11/1979 | Hedrick | 340/620 X |
| 4,272,019 | 6/1981 | Halaby, Jr. | 222/645 X |
| 4,553,702 | 11/1985 | Coffee et al. | 239/69 X |

FOREIGN PATENT DOCUMENTS

| | | | |
|---|---|---|---|
| 2515839 | 5/1983 | France | 239/69 |
| 2034922 | 6/1980 | United Kingdom | 222/644 |

Primary Examiner—Joseph J. Rolla
Assistant Examiner—Michael S. Huppert
Attorney, Agent, or Firm—Paul M. Denk

[57] ABSTRACT

A programmable, wide area insecticide (or other airborne chemical agent) dispensing system and method is disclosed in which a supply of a fluid insecticide is maintained and delivered under pressure to one or more spray heads which may be located remotely from the supply, as for example in various locations within a warehouse, dairy barn, or the like. A programmable controller effects the dispensing of the insecticide from the selected spray heads at predetermined times and in predetermined amounts so as to effectively control insects at various areas of the building at various times of the day so as to avoid indiscriminate spraying of the insecticide when it is not needed, or when it may interfere with activities within the building.

4 Claims, 3 Drawing Figures

PROGRAMMABLE WIDE AREA INSECTICIDE DISPENSING SYSTEM AND METHOD

BACKGROUND OF THE INVENTION

This invention relates to a programmable, wide area dispensing system for automatically dispensing an airborne insecticide (or other chemical agent) in predetermined amounts, in selected areas, at predetermined times of the day so as to automatically and effectively control insects and other pests, so as to minimize insecticide usage, and so as to prevent the indiscriminate spraying of the insecticide when the portions of the building are in use.

Heretofore, it has been common practice to dispense a variety of airborne chemical agents (e.g., insecticides, room deodorizers and the like) by mounting an aerosol spray can within a dispenser, the latter having a timer circuit which periodically (e.g., every hour) mechanically open the valve of the aerosol dispenser for a predetermined length of time (e.g., a few seconds) so as to emit a spray of the insecticide or other chemical agent into the environs of the dispenser. However, such dispensing systems indiscriminantly sprayed the insecticide or other chemical agent at these periodic intervals. This oftentimes resulted in spraying of the airborne chemical agent when the rooms were in use, or when the chemical agent was not needed, which in turn resulted in relatively high consumption rates for the airborne chemical agent. Further, the supplies of the chemical agents in the aerosol cannisters were of limited capacity and, due to the indiscriminate, periodic spraying, required frequent replacement. Still further, the necessity of packaging the airborne chemical agent or insecticide in aerosol containers was relatively costly.

SUMMARY OF THE INVENTION

Among the several objects and features of this invention may be noted the provision of a programmable, wide area insecticide (or other airborne chemical agent) dispensing system and method in which the insecticide is supplied in bulk containers (e.g., several gallons or more), and in which one or more spray heads are in communication with the pressurized fluid within the container;

The provision of such a programmable insecticide dispensing system which is readily controllable to vary the amount of insecticide sprayed on each application or cycle of the system, which may be readily programmed to vary the times of the day during which the insecticide is sprayed, and in which the various spraying parameters (i.e., the time of the day and the length of each spray) can be changed for each day of the week (or for longer periods);

The provision of such a programmable insecticide dispensing system in which a single programmable controller may be utilized to control a multiplicity of supply tanks and spray heads, or a central supply tank with each tank having a plurality of remotely operable spray heads located at predetermined locations within the building;

The provision of such a programmable insecticide dispensing system in which the spraying operation of the various spray heads may be readily reprogrammed; and The provision of such a programmable insecticide dispensing system and method which may be utilized to effectively treat a large warehouse or barn with a suitable insecticide, which is readily adaptable for a variety of operating conditions, which economically utilizes the insecticide or other chemical agent to be airborne dispensed, and which is reliable in operation.

Briefly stated, this invention relates to a dispensing system for periodically dispensing an airborne mist or spray of a chemical agent, such as an insecticide. The dispensing system comprises at least one supply of the chemical agent under pressure, and a spray head in communication with the supply of pressurized chemical agent. A solenoid valve is provided between the supply and the spray head for blocking and unblocking the flow of the pressurized chemical agent to the spray head for being spray dispensed. The system further includes a programmable means for energizing and de-energizing the solenoid valve so as to dispense predetermined amounts of the chemical agent at predetermined times.

Further, the present invention comprises a method of periodically dispensing an airborne fluid chemical agent, such as an insecticide, in preselected, remote areas of a building or the like, at selected times of the day, and in predetermined amounts, with the quantity of the chemical agent dispensed and the time of the day at which it is dispensed at each location in the building being independently, selectively variable. Specifically, the method comprises supplying one or more sources of chemical agent under pressure. One or more spray heads are located within the building at preselected locations. Communication is provided between the source of pressurized chemical agent and the spray heads. The flow of the chemical agent is opened and blocked to the spray heads such that each of the spray heads emits a spray or mist of airborne chemical agent at preselected times of the day and in predetermined quantities so that the airborne chemical agent can effectively treat the area of the building in proximity to each of the spray heads.

Other objects and features of this invention will be in part apparent and in part pointed out hereinafter.

BRIEF DESCRIPTION OF THE DRAWINGS

Corresponding reference characters indicate corresponding parts throughout the several views of the drawings.

DESCRIPTION OF A PREFERRED EMBODIMENT

Figure 1:
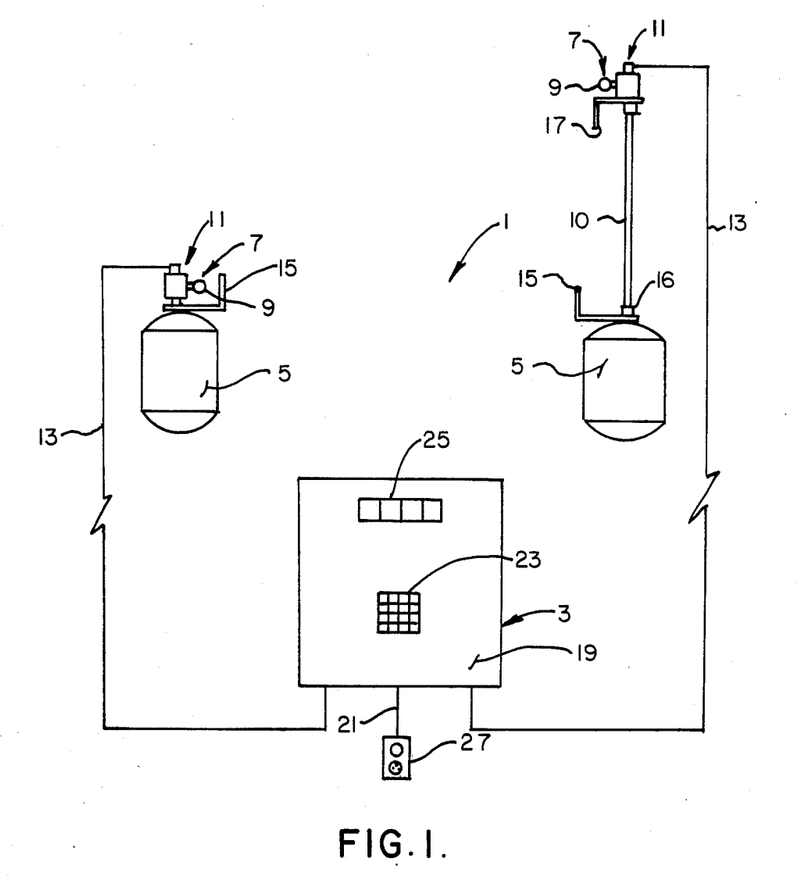
FIG. 1 is a schematic view of the programmable dispensing system of the present invention, showing a programmable control system within its housing, and showing a plurality of sources of pressurized fluid chemical agent (e.g., a liquid insecticide) located at preselected positions within a building (e.g., within a warehouse or a barn), and showing spray heads in communication with the sources of pressurized insecticide, and further showing a solenoid valve controlled by the programmable control for selective operation of the spray heads.

Referring now to the drawings, and particularly to FIG. 1, a dispensing system of the present invention, indicated in its entirety by reference character 1, is shown to comprise a programmable control system 3. Further, the dispensing system includes one or more containers 5 holding a supply of a fluid (e.g., a liquid or a gaseous) chemical agent, such as a liquid insecticide (e.g., pyrethrin). Typically, these containers or tanks are pressurized to about 150–200 psig by a suitable propellant, such as is well known in the art, such that the entire supply of the liquid insecticide contained within the container 5 may be pressure dispensed therefrom without the necessity of an outside source of pressurizing gas or the like.

System 1 further comprises a plurality of spray heads 7 selectively located at desired locations within a building or area to be treated with the airborne chemical agent or insecticide. Each of the spray heads includes one or more adjustable, rotatable nozzle assemblies 9 which may be selectively adjusted so as to emit an airborne spray or mist of the chemical agent in a desired direction.

As shown in FIG. 1, each of the spray heads 7 may either be mounted directly on container 5, or may be remotely located therefrom and interconnected to container 5 by means of a hose 10 or the like. In any event, an electrically operable solenoid valve, as generally indicated at 11, is provided between container 5 and spray head 7 so as to open or block the flow of pressurized liquid chemical agent from container 5 to the spray head upon energization and de-energization of the solenoid valve. Normally, solenoid valve 11 is in its closed position, thus blocking the flow of pressurized liquid to the spray head. Upon energization of the solenoid valve by programmable control system 3, in a manner as will be hereinafter described, a pressurized liquid insecticide is permitted to flow through the solenoid valve and to be sprayed or misted into the air via the spray head, thereby to treat the area of the environs proximate the spray head. By varying the length of time solenoid valve 11 remains open, and by increasing or decreasing the length of time between energization cycles of the solenoid valve, prescribed quantities of the chemical agent or insecticide may be sprayed into the air and the time of day at which the insecticide or other chemical agent is sprayed may be varied thereby to provide effective control of insects or the like, and yet not interfere with normal operations within the building proximate particular spray heads.

Figure 3:
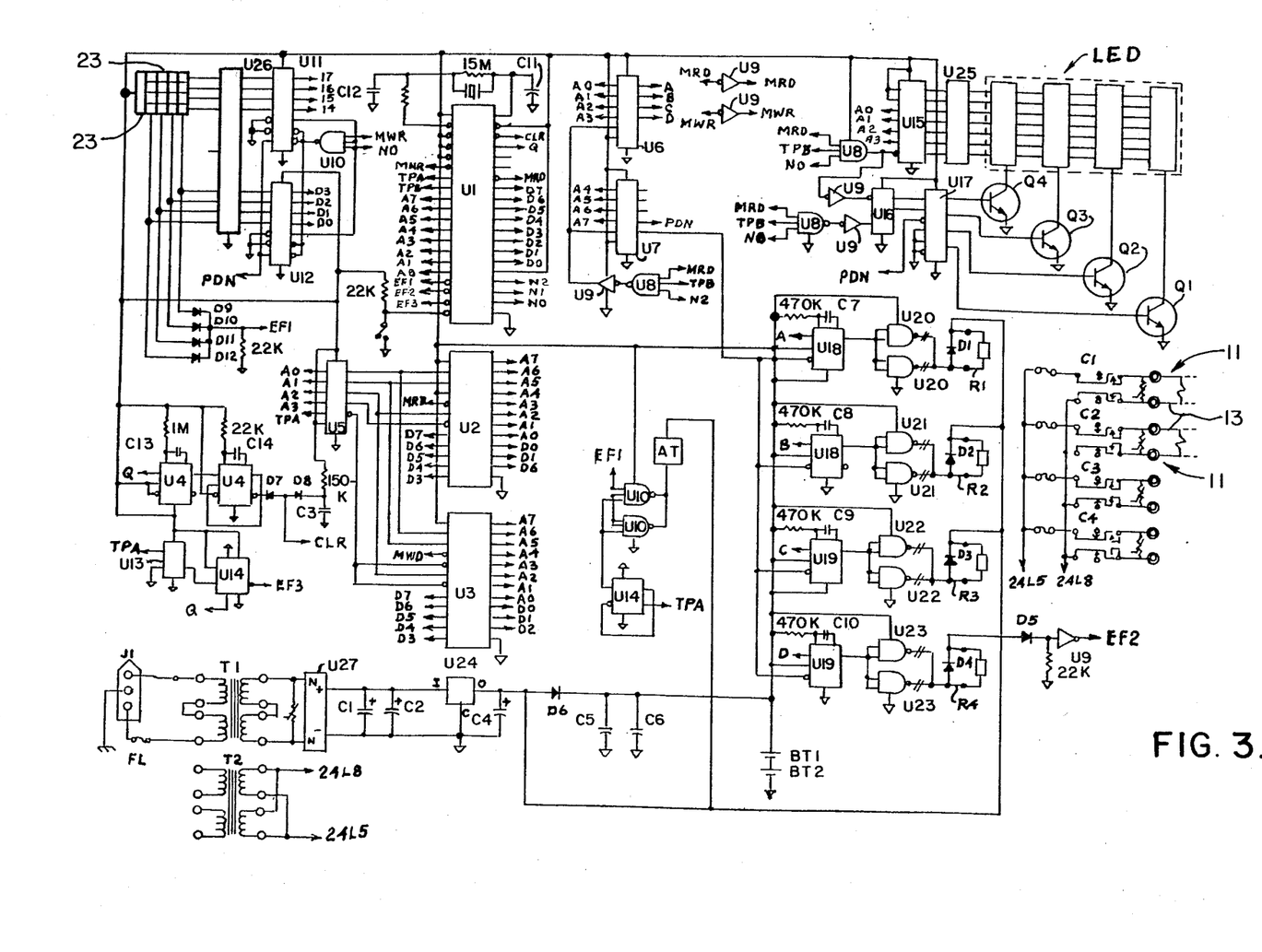
FIG. 3 is an electrical schematic of the programmable control system of the present invention.

As shown in FIGS. 1 and 3, control system 3 is interconnected to the solenoids by means of low voltage (e.g. 24 volts), AC wiring 13, utilized for energization of the solenoid valves 11, for each sprayer. Containers 5 are provided with mounting brackets 15 so that the container can be rigidly mounted on a wall or other structure of the building. In other instances, container 5 may rest on the floor or a shelf, and a quick disconnect fitting 16 may be provided between hose 10 and the container for the exchange of an empty container 5 with a filled container. Additionally, remotely located spray heads 7 and their respective solenoid valves 11 may be securely mounted on a mounting bracket 17 in a desired location within the building to be treated. It will be understood that with spray heads 7 mounted on the bracket 17, and with remote hose 10 interconnecting the spray head (or spray heads) with container 5, the spray heads may be positioned in the most desirable locations within the building so as to effectively treat the area proximate the spray head.

For example, in many applications using a pyrethrin insecticide in container 5, each spray head 7 will effectively treat up to about 5,000 square feet (464 square meters) surrounding the spray head. System 1 of the present invention may control up to 16 different spray heads 7 so that the entire system 1 of the present invention can provide insect control for buildings up to about 80,000 square feet (7,432 square meters). In practice, it has been found that one spray head can disperse liquid insecticide up to about 75 feet (22.9 meters) in any one direction. With spray head 7 having two adjustable nozzles 9 thereon, and with the adjustable nozzles being directed in opposite directions, each spray head can effectively dispense liquid insecticide over a distance ranging up to about 150 feet (45.7 meters) in two directions. Also, it may be preferable, particularly in high ceiling buildings, to locate the spray heads 7 relatively high so that insects resting in the upper areas of the building come into contact with the insecticide, and so that as the liquid insecticide settles, it will come into contact with lower flying insects and also with crawling insects.

Turning now to a more complete description of programmable control system 3, the control system is located within a cabinet or housing 19 located at a convenient position within the building and, as heretofore mentioned, may be utilized to control up to as many as 16 different spray heads 17. Control system 3 utilizes a microprocessor U1, to provide for energization and de-energization of up to sixteen spray heads 7. More particularly, the control system 3 has four individually programmable channels, each of which can operate four spray heads 7.

In accordance with this invention, each output channel of control system 3 may be selectively and independently programmed for its own operation scheme. Control system 3 includes a clock means which may be optionally switched either to seven-day or 24-hour operation. Additionally, the length of time that each channel remains energized during one of its operational cycles may be varied so that each channel may be energized at a variety of times during the course of a day or a week, and so that the length of time that a selected output channel remains energized can be varied, thus permitting an operator to selectively vary the times of the day or the week during which insecticide is dispensed, and also permitting the quantity of the insecticide dispensed during each operational cycle to be selectively varied. It will be appreciated that in certain areas of a warehouse, barn, or other building in which it is desired to have effective insect control, insects may not be a severe problem, and thus one application of insecticide per day or per week may be sufficient. In other areas of the building, it may be necessary to dispense the insecticide more often to effectively control insects. Additionally, at various times of the day, it may be necessary to repeatedly dispense insecticide as, for example, in a dairy barn. Also, it will be appreciated that during certain times of the day it may not be desirable to dispense and airborne insecticide.

Figure 2:
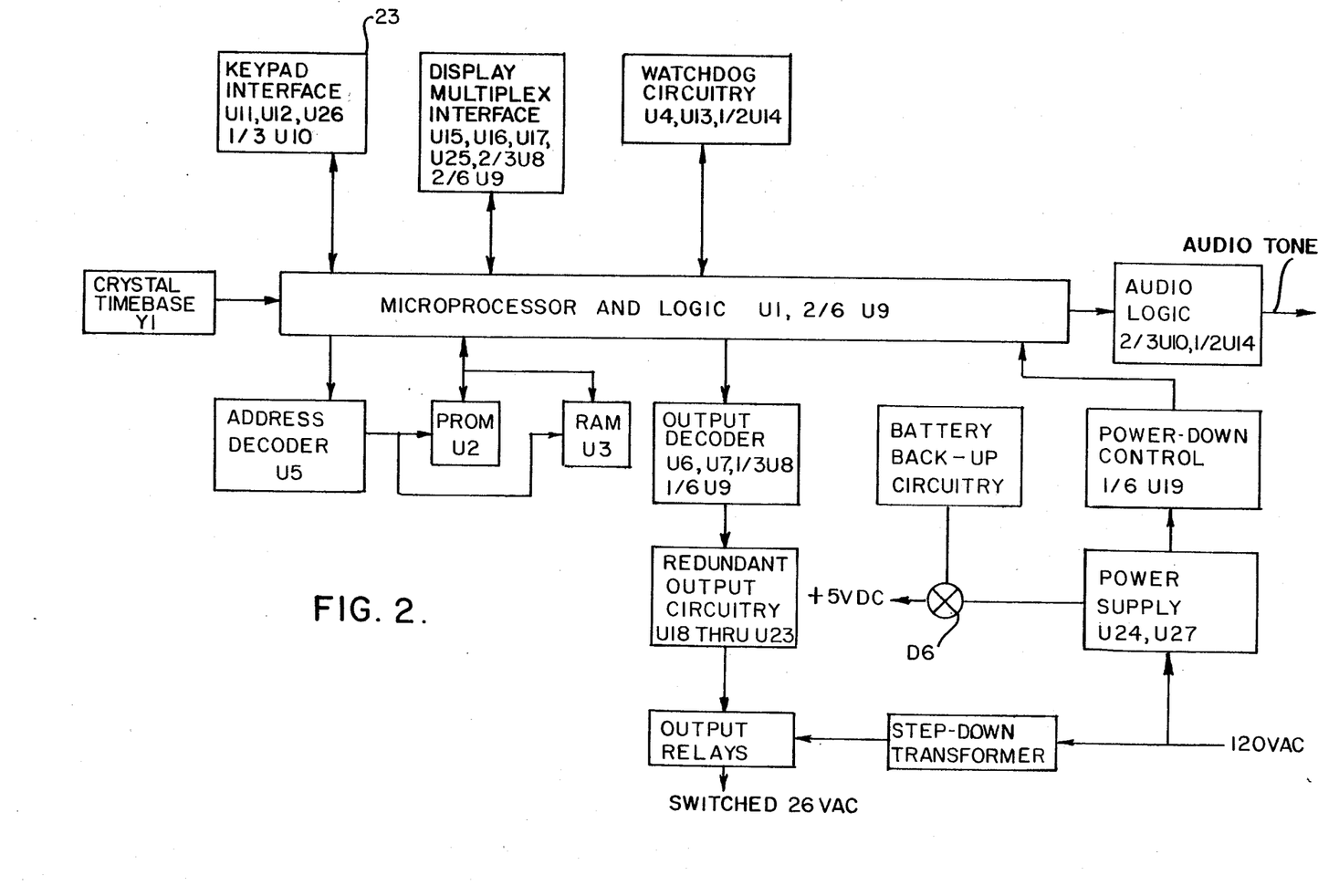
FIG. 2 is a block diagram of the programmable control system.

In referring to the block diagram of FIG. 2, an overall illustration of the control system 3 of this particular invention is disclosed. Initially, the power supply receives an input of 120 volts AC, and that power supply, identified as U24, U27 steps down and delivers a 5 volts DC to the circuitry of the system. U-24 is a 5 volt regulator of standard configuration, and the U-27 component therein is a bridge rectifier that is built into the integrated circuitry package. This is a full wave bridge power supply which delivers 5 volts to the circuitry through the diode DC, noted in the block diagram as the diode DC. The battery back-up circuitry is a battery system consisting of two cells, of 2 volts each, applied through the diode logic circuitry as just previously referred to. The power-down control block is an integrated circuitry inverter that sense if there is a commercial AC power being supply being supplied from the power supply, and if not, it sends a signal to the microprocessor U1 at its input tap EF2. This essentially is the power source system for the microprocessor and its logic.

Also disclosed is a second transformer in the design of a step-down transformer that converts the 120 volts AC to 24 volts AC. It is marked as supplying 26 volts, to the output relays of the system. This voltage is switched between open and closed circuitry by way of the output relays as identified upon the block diagram.

The essential component for this particular invention is the microprocessor U1 and its logic, as noted upon the block diagram, and this is the essential component for the computer operations of the electronic circuitry. This particular microprocessor may be obtained from RCA Corporation, of Summerville, N.Y., under component No. CDP 1802 ACE. The microprocessor has a built-in oscillator that is a crystal time base oscillator Y1. It is a crystal that allows the microprocessor to operate within a particular frequency range, and hence, and at a particular time so that it can keep track of the real time for operation of the system. It has software that counts in seconds how much time elapses from some preset point, which is determined and set into the system through the keypad interface U11, also noted at 23. The microprocessor achieves its memory from the prom U2 which is the operating system for the said microprocessor. The address decoder U5 decodes address lines that derive from the microprocessor and determines whether it is to address the prom, or the random access memory U3. A data bus, not shown, is tied to both of these components simultaneously and the address determines which one of the two integrated circuit memories the microprocessor is signalling.

The keypad interface, shown at 23, and which will be subseqently described, comprises a series of gates that allows the user to press one or more keys of the device, and the microprocessor U1 then recognizes which keys have been pressed and the data from the keypad then transfer through its latches U11 and U12, to the microprocessor. The components U10 and U26 are simply peripheral controls. U26, as will be subsequently described, that functions in cooperation with the keypad, is actually a package of resistors that pulls down to ground the charge through particular circuit lines of the keypad, so that when a single key is depressed, the ones that are not actuated have a reference, which in this case, happens to be ground.

The display multiplex interface, as at U15, consists of a series of integrated circuits which are generally identified upon the block diagram, and which will be subsequently described, and further incorporate a series of transitors that provide for at least four bytes of data to be decoded at four different periods of time, and depending upon which segment of time is being detected with respect to the operations of the sprayer system, provides for a light up of the first through fourth positions of its associated LED display.

What is identified as the watchdog circuitry is a hardware item that is controlled by the software. Periodically pulses come out of the microprocessor U1 due to the program resetting of its timers for counting in seconds. If for some reason the microprocessor, or its program, fails, this particular watchdog circuitry detects when it does not receive the necessary pulse, it then delays for a few milliseconds of time, and then it resets the pulse back to the microprocessor with an indication that the program has failed within the system. Since the watchdog circuitry is operating in real time, these pulses that trigger the watchdog circuitry are periodic and it can be predicted when they should precisely occur. If these pulses disappear for any length of time, then it means that something must have gone wrong with the microprocessor, and it sends a repulse back to the microprocessor to reinitiate its operations. The microprocessor then starts at zero (0) and tries to determine just where the malfunction has occurred. If it cannot, then it does not send any pulses out to the watchdog circuitry, and this particular process then occurs over and over again until the acknowledgement of a malfunctioning is made by the operator. If for some reason the microprocessor or its software or program has failed, then the unit does go back to its zero (0) operating mode, and essentially everything of the system turns off.

The audio logic of the device simply takes the timing signal that is deriving from the microprocessor, and from the time base it simply divides it down into something audible. And, there is sensor within the audio logic that emits an audio tone when one of the buttons are keys of the keypad are depressed. This audio tone is controlled from the keypad, so regardless whether the processor is functioning, or not, as long as the microprocessor time base is operating, the audio logic will deliver tones when a key of the keypad is depressed. This may or may not mean that the unit is operating, it simply means that the time base deriving from the microprocessor is operating.

The output decoder consist of various integrated circuits U6 and U7, and part of the U8 and U9 components, and is simply an output latch decoder. Eight bytes of data, four of which are used for this system, become present at a certain period of time upon the address bus, and the output pulse goes to the decoders which provides and triggers the output of select signals. These signals provide functioning to the monostable ultivibrators, which in this particular instance, comprise the elements U9. This particular configuration is called a retriggerable monstable multivibrator, and it will pulse the proper channels at the designated time and then subside. If the output decoder somehow fails and the pulse does not appear at it, then after an elapse of time, the output circuitry causes the output relays of the system to turn off. The reason for this is that if a failure occurs when the system was on, the first requirement is that the system should be shut off. In other words, it is essential that microprocessor control occur throughout the operations of the system, and in the event that a malfunction occurs, then the entire system is to be shut down. So the redundant output circuitry is incorporated into the output decoder, and you have data that becomes available to the output decoder, is addressed, and latches the data, with the redundant output being triggered if the trigger fails to appear the second time at the decoder, then the system eventually turns off after about 750 milliseconds. This is a very generalized description of the block diagram for this particular invention, and the more detailed description of its circuitry will follow.

The diagrams in FIG. 2 and the electrical schematic more specifically shown in FIG. 3, incorporates a programmable control system 3 that utilizes CMOS circuitry, controlled by the microprocessor U1. This results in a control system which utilizes little electrical power, and which has a high immunity to electrical noise. The clock utilized for controlling the system is a crystal Y1 which counts time in seconds, and which indexes in timebase of minutes, hours, and days from an initial starting point. Keyboard 23 utilizes a 16 place keyboard, and has a four digit numerical display 25 associated therewith so that the time of the day and the initiation times programmed into the control system for each output channel can be displayed.

Microprocessor U1 provides output to four channels, with each of the channels being individually programmable as stated above. Each output channel can provide output signals so as to operate up to four different spray heads 7. The microprocessor has 200 programmable slots or spaces in its memory, and each slot will accept four pieces of information, namely, the channel designation, the day (one to seven), the starting time based on a 24-hour clock, and the duration of the operational cycle (from 1 to 99 seconds).

Control system 3 can either be set as a one-day clock or as a seven-day clock. By utilizing a seven-day clock, the program for operation of each of the spray heads may be varied from day-to-day during the week. However, if it is desired to operate each of the spray heads at the same time of day on each day of the week, then the clock can be effectively utilized as a 24-hour clock.

In addition to providing for automatic dispensing of insecticide, control system 3 may be manually operated by depressing a combination of two keys on keyboard 23 so as to override the automatic control functions of the system, and to permit automatic dispensing of the insecticide.

Additionally, selected channels may be disabled thereby to prevent spraying of insecticides controlled by that channel. However, when a channel is disabled, its program is not erased. When it is desired to return to normal, automatic operation of that channel, the override to that channel is removed and automatic insecticide dispensing can be reinitiated without the necessity of resetting the programmed controller. Each channel can be checked and the times at which it is programmed to emit spray from one or more of the spray heads can be read out on display 25. If such a program is not now desired, it may be modified or cancelled by the operation of keyboard 23.

It will also be appreciated that while the output signals are utilized for controlling solenoid valves 11, this programmer can be utilized to control other functions within the building, such as lighting and the like.

FIG. 3 shows the location in detailed circuitry of the various components enumerated in FIG. 2, and as identified hereinafter for conducting the various procedures for the block diagram of this invention. Referring to the control system 3, its electrical schematic is shown in FIG. 3, comprising a 120 volt AC input furnished to the transformer T1 and power supply U24 and U27. The power supply then delivers 5 volts to the circuitry. U24 is a 5 volt regulator of standard configuration, and U27 is a bridge rectifier that is built into the integrated circuit packet. This is a full wave bridge power supply which delivers 5 volts to the circuitry through the diode D-6, where noted. The battery back-up circuitry is simply a battery system consisting of two cells, two volts each, through the diode logic circuitry, as explained. The power down control block is an integrated circuit inverter that senses if there is a commercial AC power from the power supply, and if not, it sends a signal to the processor at its input EF2. This essentially is the power source system for the logic and the microprocessor.

There is also provided a second transformer in the design of a step-down transformer that converts 120 volts AC to 24 volts AC. This is noted upon the block diagram of FIG. 2. This is marked as 26 volts AC on the diagram. This voltage is switched between open and closed circuitry by way of a relay, generally identified in the block diagram as the "Output Relays". The microprocessor U1 has a built-in oscillator that is a crystal oscillator, and in the block diagram is marked as "Crystal Timebase Y-1", and is simply a crystal that allows the microprocessor to operate within a particular frequency, and hence, a particular time so that it can keep track of real time. It incorporates software that counts in seconds how much time elapses from some preset point that is controlled by the user and the keypad 23. It gets its memory from the Prom U2, which is the operating system of the processor. The Address Decoder U5 decodes the address lines that come from the microprocessor and determines whether it is to address the Prom which is the operating system of processor U2, or the Random Access Memory U3. A data bus is tied simultaneously to both the Prom and the Ram simultaneously and the address determines which one of the two integrated circuit memories it is signalling. There is the keypad interface 23, as noted, which is a series of gates that allows the user to press a key, the processor to recognize that the button was pressed, and the data to be transferred through the latches U11 and U12. The members U10 and U26 are peripheral controls. Even though the keypad in the block diagram is marked as U26, U26 is really a package of resistors that pull down the lines when they are not being used, so that when a single button is pressed, the ones that are not pressed have a reference, which in this case is ground.

The U26 element is a resistor package which simply keeps the data on the keypads or on the keys that are not pressed, whereas the keys that are pressed are then the U11 and U12 are the latches which detect which keys have been depressed and the elements U11 and U12 are addressable circuits that are read by the microprocessor U1. The element U10 is a gate which functions as a decoder logic for determining exactly when the microprocessor is to read the contents of the latches U11 and U12. The microprocessor then determines through its inherent memory and program as to what is the next step to be performed as a result of the depression of the keypads, and its sends an output signal to or similar type output latches, to be next explained, that indicate what particular step of the program is to be performed by the system.

The Display Multiplex Interface is a combination of several integrated circuits, as marked on the block diagram, and also in FIG. 3, and which incorporate select transistors Q1 through Q4. This is a multiplex system that allows four bytes of data to be decoded at four different periods of time, depending on what period of time is selected, and lights up either a first, second, third, or fourth position of the LED display.

The watchdog circuitry is a hardware item that is controlled by select software. Periodical pulses come out of the microprocessor because the program resets the timers for counting seconds. If for some reason the program of the microprocessor U1 fails, the unit that watches, which are the U4, U13, and part of the U14 components, if they do no receive pulses, they wait for a few milliseconds and then send a reset pulse back to the microprocessor U1 to indicate that program operation has failed. Since the apparatus is operating in real time, the pulses that trigger the watchdog circuitry are periodic, and can be used to predict when exactly they are to occur If these pulses disappear for any length of time, the microprocessor or its integral software may be malfunctioning, or some other component is malfunctioning, and it sends a reset pulse back to the microprocessor. If such does not occur, then no pulses are delivered to the watchdog circuitry, and this process occurs over again until such time as the watchdog circuitry becomes triggered indicating that a malfunction has occurred. If for some reason the software or microprocessor has failed, the unit goes back to zero (0) operating mode, and essentially the system is turned off.

The audio logic component disclosed in the block diagram takes the timing that is derived from the microprocessor U1 and more specifically from its time base and divides it down into a more audible frequency. And, there is a sensor that emits an audio tone when one of the buttons is pressed upon the keypad. This audio tone is controlled from the keypad, so reqardless whether the processor is working or not, as long as the microprocessor time base is operating, the audio logic will generate a tone will be heard when a key upon the keypad is pressed. This may indicate whether the unit is operating, but it does provide means for determining that the time base is functioning.

The output decoder consists of various integrated circuits U6, U7, one-third (⅓) U8, and one/sixth (1/6) U9, and comprises an output latch decoder. Eight (8) bytes of data, four (4) of which are used for this application, are present at a certain period of time upon the address bus, and the output pulse goes to the decoders comprising the element U6 and triggers a one-shot monostable multivibrator. This particular configuration is called a retriggerable monostable multivibrator, and it will pulse the proper channel at the proper time and then recount the time, then repulse the channel as required. If the output decoder somehow fails and the pulse does not appear, then after an elapse of time the output circuitry causes the output relay to turn off. The reason for this is that if a failure occurs, select components must be detected for turnoff. There is a need for microprocessor control at all times. So any redundant output circuitry is incorporated into the output decoder, though just briefly, and you have data that becomes available through the decoder and is addressed and latches the data, and the redundant output is triggered if the signal fails to appear the second time and eventually turns itself off after about 750 milliseconds.

The microprocessor U1, as previously explained, is obtained from RCA under its designation number as noted. U2 and U3 are the Prom and Ram elements that have already been described.

When data is inputted into the device, as through its keypad 23 the microprocessor has data already stored in it, or its program, and the microprocessor then reads the keypad for determination as to the function to be performed by the system.

The microprocessor determines in its program as to what is the next step to be performed and its output passes through the latches U6 and U7 and through that determines which of the four (4) output channels U18 and U19 is to be initiated and rendered functional within the sprayer apparatus. The U18 elements are retriggerable one shot multivibrators and when initiated, provide for gating of their signals through the elements U20 through U23, which in turn passes its signal through one of the relay coils noted at R1 through R4, which in turn then sends its selected signal to one of the contacts C1 through C4, which in turn produces an output signal that initiates one of the solenoids or valves, since there are four contacts C1 through C4 respectively. In this invention, the closing of a contact may open a valve to allow for a momentary spray of one of the sprayer apparatuses of this invention, so these contacts may be used to iniatate any number of valves that may be associated with each contact for providing for an equal number of sprays throughout the facility in which the apparatus is located.

In addition to the foregoing, there is that display to the operator to inform him as to just what segment of the apparatus may be functioning at any given time. For example, the LED display receives its input from the microprocessor through the gates U8, and through the element U15 which is a decoder latch driver which drives the individual four (4) display sections of the LED, passing its signals through the element U25, which is the display multiplex interface, or its resistor package therefor. The elements U16 and U17 are counters and they respectively control their transitors Q1 through Q4, and as previously explained, when turned on provide for an ignition of the individual diode displays to which each respectively connects.

The elements in the circuit diagram comprising U4, U13 and U14 are the watchdog circuitry as previously explained. This particular circuitry simply watches the operations of the device and the software within the microprocessor, The operating system software, which may be contained in the Prom U2 periodically pulses the elements U4 which are retriggerable one-shot multivibrators, and when a pulse does not occur during a given period of time the watchdog then pulses, or resets the microprocessor U1 which then causes the entire system to start from 0, or be initiated once again. The element comprising the resistor 150K and the capacitor C3 is a power-up reset which initiates the circuitry of the watchdog when the device is first turned on.

In the circuit diagram, the gates U10 are drivers for turning on the audio tone AT, of the audio logic, when any button is depressed upon the keypad 23. This simply lets the operator know that the signal is being transferred and that the microprocessor has recognized its entrance.

The values for the components of the circuitry shown in FIG. 3 are disclosed in the following table:

| CAPACITORS | |
|---|---|
| Component Number | Capacitance (micro farads) |
| C1 | 2200 uF/25 V |
| C2 | 2200 uF/25 V |
| C3 | 3.3 uF/15 V |
| C4 | 100 uF/16 V |
| C5 | 100 uF/16 V |
| C6 | 0.1 uF/50 V |
| C7 | 1.0 uF/15 V |
| C8 | 1.0 uF/15 V |
| C9 | 1.0 uF/15 V |
| C10 | 1.0 uF/15 V |
| C11 | 10 pF/500 V |
| C12 | 39 pF/500 V |
| C13 | 0.1 uF/50 V |

-continued

CAPACITORS

| Component Number | Capacitance (micro farads) |
| --- | --- |
| C14 | 0.1 uF/50 V |

TRANSISTORS

| Component Number | Designation |
| --- | --- |
| Q1 | PN2222 |
| Q2 | PN2222 |
| Q3 | PN2222 |
| Q4 | PN2222 |

DIODES

| Component Number | Designation |
| --- | --- |
| D1 | 1N4002G |
| D2 | 1N4002G |
| D3 | 1N4002G |
| D4 | 1N4002G |
| D5 | 1N914B |
| D6 | 1N4002G |
| D7 | 1N914B |
| D8 | 1N914B |
| D9 | 1N914B |
| D10 | 1N914B |
| D11 | 1N914B |
| D12 | 1N914B |

TRANSFORMERS

| Component Number | Description | Designation |
| --- | --- | --- |
| T1 | 12-Volt, 200-milliAmpere | DST3-12 |
| T2 | 24-Volt, 6-Ampere | DL24-6 |

MISCELLANEOUS COMPONENTS

| Component Number | Description | Designation |
| --- | --- | --- |
| U1 | Microprocessor | CDP1802ACE |
| U2 | EPROM | I2716 |
| U3 | RAM | CDM6116E |
| U4 | Monostable Multivibrator | CD4098BE |
| U5 | Clocked D-type Latch | CD4042BE |
| U6 | Clocked D-type Latch | CD4042BE |
| U7 | Clocked D-type Latch | CD4042BE |
| U8 | NAND Gate | CD4023BE |
| U9 | Schmitt Inverter | CD40106BE |
| U10 | NAND Gate | CD4023BE |
| U11 | D-type Register | CD4076BE |
| U12 | D-type Register | CD4076BE |
| U13 | Binary Divider | CD4040BE |
| U14 | D-type Flip/Flop | CD4013BE |
| U15 | Latch Decoder Driver | CD4511BE |
| U16 | Binary Divider | CD4024BE |
| U17 | Demultiplexer | CD4555BE |
| U18 | Monostable Multivibrator | CD4098BE |
| U19 | Monostable Multivibrator | CD4098BE |
| U20 | NAND Buffer/Driver | CD40107BE |
| U21 | NAND Buffer/Driver | CD40107BE |
| U22 | NAND Buffer/Driver | CD40107BE |
| U23 | NAND Buffer/Driver | CD40107BE |
| U24 | +5-Volt Voltage Regulator | uA7805CkC |
| U25 | Resistive Network | 4116R-001 |
| U26 | Resistive Network | 4308R-101 |
| U27 | Rectifier Network | PL10 |

From the above description and from the diagrams and schematics presented in FIGS. 2 and 3, one skilled in the art could construct and operate control means 3.

It will be understood by those skilled in the art that the control system shown in FIGS. 2 and 3 only represents one such control system which is presently believed to be the best mode for carrying out the principals of this invention. However, other control systems functioning in generally the same manner may be utilized in place of the circuitry shown in FIGS. 2 and 3. Thus, FIGS. 2 and 3 are submitted to be illustrative of any number of variations of an electronic control system, and is not to be read in a limiting fashion.

With spray heads 7 mounted within a building so as to effectively control insects within the area surrounding each of the spray heads upon dispensing of an insecticide or other chemical agent from tank 5, the control system of this invention serves to effectively control insects or the like by supplying one or more sources of a liquid chemical agent or insecticide under pressure in containers 5 located generally proximate respective spray heads 7. As shown in FIG. 1, the spray heads may be located directly on containers 5, or they may be located remotely from the container and interconnected thereto by hose 10. It will also be appreciated that one container 5 may supply the fluid chemical agent under pressure to one or to a plurality of spray heads 7. In any event, communication is provided between the source of the pressurized insecticide and the spray heads. Periodically, the flow of the insecticide between the container 5 and the spray heads 7 is opened and closed such that each of the spray heads emits a mist or spray of the airborne insecticide or chemical agent at preselected times of the day or week, and for a predetermined length of time, such that the airborne insecticide can effectively treat the area of the building in proximity of the spray head.

In view of the above, it will be seen that the other objects of this invention are achieved and other advantageous results obtained.

As various changes could be made in the above constructions or method without departing from the scope of the invention, it is intended that all matter contained in the above description or shown in the accompanying drawing shall be interpreted as illustrative and not in a limiting sense.

What is claimed is:

1. A programmable dispensing system for periodically dispensing an airborne mist or spray of a fluid chemical agent, such as an insecticide or the like, comprising, at least one supply of said liquid chemical agent under pressure, a plurality of spray heads in communication with said supply of pressurized chemical agent, solenoid valves for blocking and unblocking the flow of said pressurized fluid chemical agent to said spray heads, and programmable means for energizing and de-energizing said solenoid valves so as to dispense predetermined amounts of said chemical agent at predetermined times, said programmable means incorporating a microprocessor, said microprocessor providing outputs for control of a plurality of channels, each channel being individually programmable to provide output signals so as to operate a selected number of the plurality of spray heads, a power supply for the programmable means, said power supply incorporating rectifier means and voltage regulating means for providing a stepped down voltage for operating the programmable means, clock means operatively associated with the microprocessor and when set providing for at least a one-day and up to a seven-day timed operations of dispensing spray heads, key pads means operatively associated with the microprocessor for inputing of data to the same, address decoder means, PROM means, and random access memory means electrically connected together and coupled with the microprocessor and when functioning providing the operating system for the said microprocessor, output decoder means connecting with the microprocessor, and output relays responsive to the output decoder means and functioning to initiate selection of the said solenoids to turn on or off the connected spray heads in response to the timed operations determined by the microprocessor.

2. A dispensing system as set forth in claim 1 wherein said system comprising a plurality of said solenoid valves and a plurality of said spray heads with each of said solenoid valves controlling the flow of said fluid chemical agent to one or more of said spray heads, said spray head being located in select areas of a building or the like.

3. The invention of claim 1 and including display multiplex interface means operatively associated with the microprocessor, and display means incorporating light emitting diode displays provided within the display multiplex interface means and providing for a display information inputted into the programmable means.

4. The invention of claim 1 and including audio logic means electrically coupled with the microprocessor and providing an audible tone when the keypad is operated.

* * * * *

UNITED STATES PATENT AND TRADEMARK OFFICE
CERTIFICATE OF CORRECTION

PATENT NO. : 4,671,435

DATED : June 9, 1987

INVENTOR(S) : Daniel M. Stout, Michael W. Ellis, Arthur R. Terwilleger, and Robert D. Shankle, Jr.

It is certified that error appears in the above—identified patent and that said Letters Patent is hereby corrected as shown below:

On the cover page, line 73, the name of the assignee "Whitmine" should be changed to ---Whitmire---.

Column 14, claim 3, line 11, after "play" insert ---of---.

Signed and Sealed this

Twentieth Day of October, 1987

Attest:

DONALD J. QUIGG

Attesting Officer

Commissioner of Patents and Trademarks